Feb. 29, 1944.  A. A. TOGESEN  2,343,232
ADJUSTABLE CONNECTOR FOR ELECTRICAL DISTRIBUTION SYSTEMS
Filed July 18, 1942  4 Sheets-Sheet 1
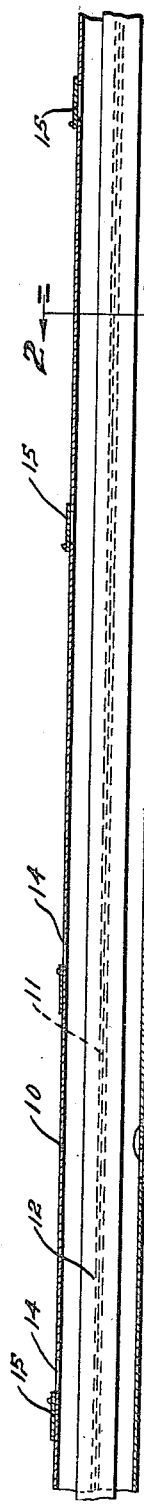
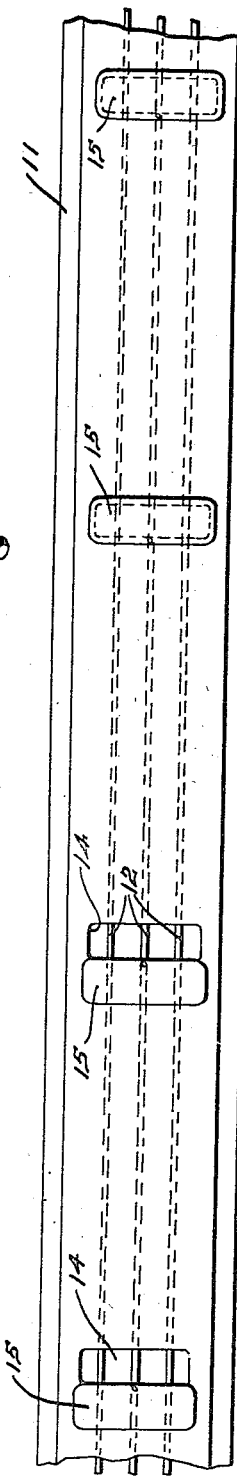
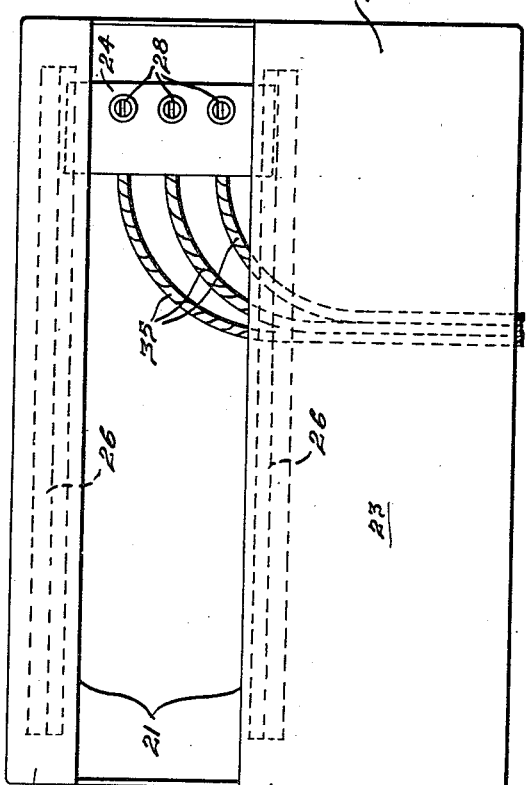
INVENTOR
ALVA A. TOGESEN
BY
*Daniel G Cullen*
ATTORNEY

INVENTOR
ALVA A. TOGESEN
BY
ATTORNEY

Feb. 29, 1944.　　　A. A. TOGESEN　　　2,343,232
ADJUSTABLE CONNECTOR FOR ELECTRICAL DISTRIBUTION SYSTEMS
Filed July 18, 1942　　　4 Sheets-Sheet 3

INVENTOR.
ALVA A. TOGESEN
BY
Daniel G Cullen
ATTORNEY.

Feb. 29, 1944.　　　　A. A. TOGESEN　　　　2,343,232
ADJUSTABLE CONNECTOR FOR ELECTRICAL DISTRIBUTION SYSTEMS
Filed July 18, 1942　　　4 Sheets-Sheet 4

INVENTOR.
ALVA A. TOGESEN
BY Daniel G. Cullen
ATTORNEY.

Patented Feb. 29, 1944

2,343,232

UNITED STATES PATENT OFFICE 2,343,232

ADJUSTABLE CONNECTOR FOR ELECTRICAL DISTRIBUTION SYSTEMS

Alva A. Togesen, Royal Oak, Mich., assignor to Bulldog Electric Products Company, Detroit, Mich., a corporation of West Virginia Application July 18, 1942, Serial No. 451,438

4 Claims. (Cl. 173—334)

This application relates to a terminal box for electrical distribution systems, whereby connection may be established between a branch run, and a main run having uniformly spaced access openings in its conduit.

A prior Patent No. 2,041,675 discloses a bus bar system consisting of a length of conduit containing conductors and having uniformly spaced branch run access openings on opposite sides of the conduit. Such a conduit may be used as a main run. Branch circuit terminal boxes are adapted to be mounted on the main run, with connectors thereof thrust through a selected one or more of such openings, to establish contact between the main conductors and branch conductors of which the box connectors are terminals. That application discloses the branch run conduits as of such form, flexible, that their terminal boxes may easily be located in line with the particular ones of the access openings of the main run through which it is desired to establish contact to the main run conductors.

It is often desirable to utilize a branch run conduit of such form that it is not always possible to distort it and cause its terminal box to align to a selected access opening of the main run. Thus there arises the problem of connecting a branch run to a main run despite the fact that the branch run terminal box cannot be aligned to the selected access opening of the main run. To solve that problem we have provided the adjustable terminal box herein disclosed.

In addition, there often arises the problem of connecting a branch run to a main run, and supplying it through several openings of the main run, and the terminal box herein disclosed solves that problem.

It therefore appears that the terminal box herein disclosed may be located at any point of a main run, may establish connection through one or more openings of the main run regardless of its location, and may be connected to a branch run regardless of its location.

The terminal box herein disclosed will now be described upon reference to the appended drawings.

In these drawings,

Figs. 1-2-3 show a main run.

Figs. 4-6 show a terminal box formed for connecting through but one access opening of the main run.

Figure 5:
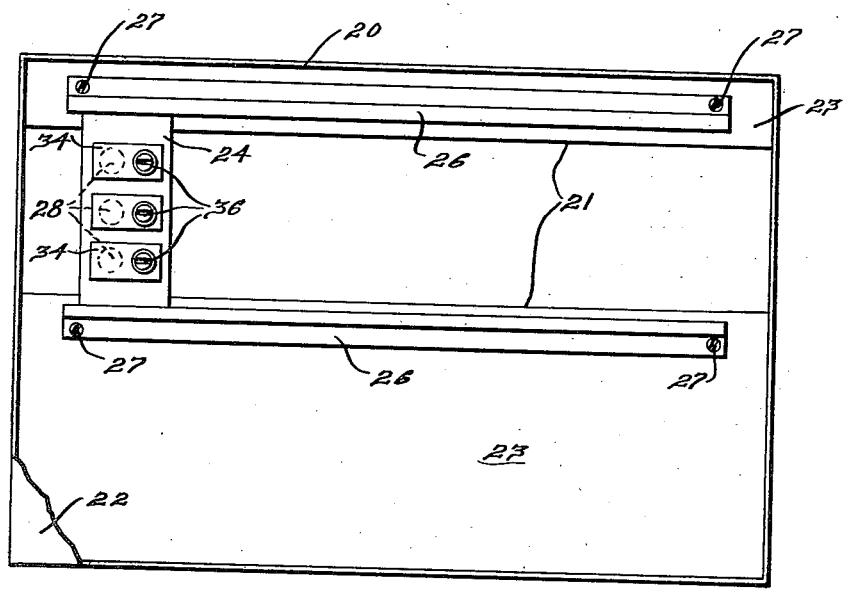

As described in Patent No. 2,041,675, and as here disclosed, a main run may include a sheet metal conduit 10 having side flanges 11 and containing conductors 12 and having, on opposite walls, offset, uniformly and longitudinally spaced branch run access openings at locations 14, these being normally closed by removable shutters 15. At right angles to the main run A is to be connected a branch run B, which is shown as being identical in construction to the main run and thus also provided with a casing 10 having lateral flanges 11 and containing conductors 12.

Other forms of branch runs may be utilized, such as rigid conduit and wire, etc.

The terminal box consists of a sheet metal box 20 having a large opening 21 in its bottom surface and having its top surface completely open but adapted to be closed by a removable cover 22. Adapted to bridge the portions 23 which form whatever there is of the bottom of the box 20, is an insulator block 24, removably secured in place on the portions 23 by means of Z shaped clamping rails 26 removably secured to the portions 23 by screws 27, the construction permitting the block 24 to be moved lengthwise of the box 20 so as to align connectors 28 of block 24 with the selected opening 14 of the main run, regardless of the position of the box 20 with respect to the selected opening. Thus, when a box 20, which is non-adjustably connected to a branch run whose location is fixed, is mounted over and secured to a main run, any one of the main run openings 14 exposed through the opening 21 of the bottom of the box, may be utilized for reception of the connectors 28 secured to block 24, merely by adjusting the position of the block 24 in box 20 to align to the selected opening.

The box may have a large number of knockouts 29 one of which may be selected to permit a branch run to be connected thereto, wherever it may happen to be; the knockouts may conform in shape to the shape of the branch run conduits, several round ones and one oblong one being shown.

For securing the box to the main run in any desired location, there are provided channeled rails 31 secured to portions 23 at the bottom of the box, and running the length of the box. Small U shaped clamps 32 encompass flanges of these rails 31 and the lateral conduit flanges 11; they are adjustable along the rails 31 and contain clamp screw bolts 33, nuts of which may be threaded down to clamp and secure the box to the conduit flanges 11, with the box being in any desired longitudinal adjustment with respect to the main run.

Figure 6:
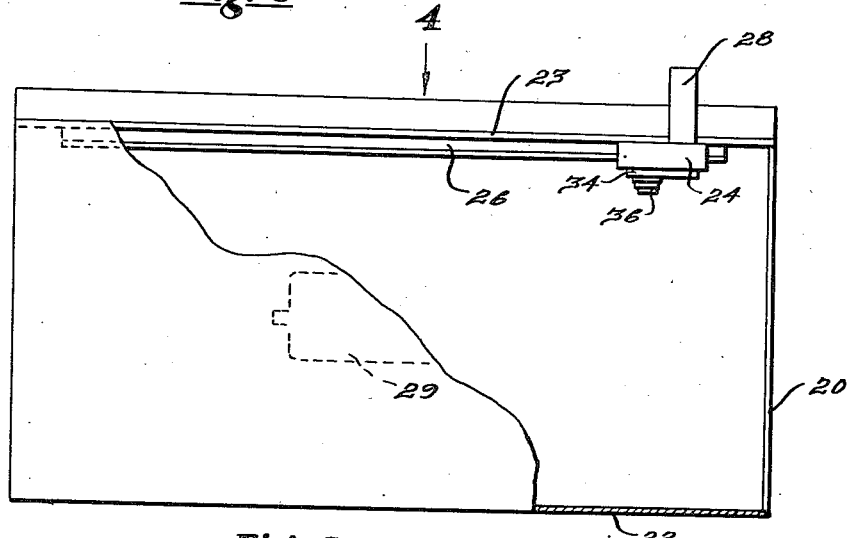
Figure 7:
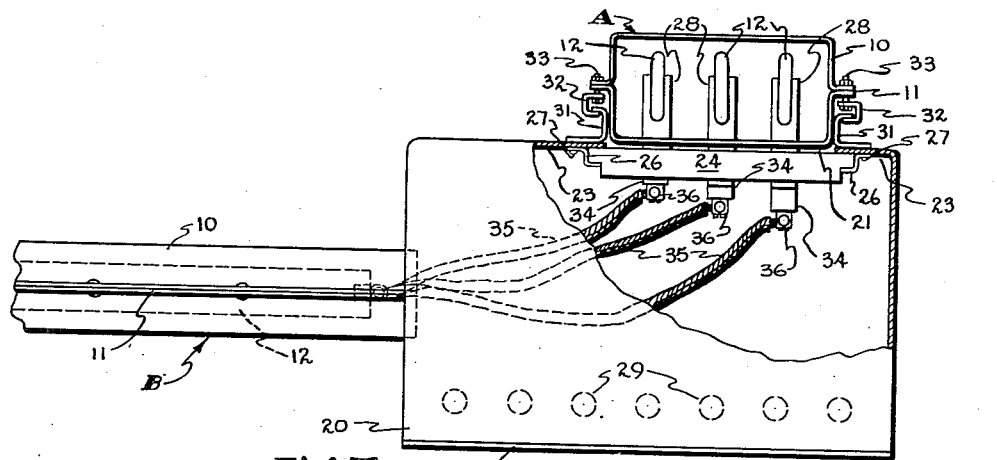
Figs. 7-9 show a terminal box formed to connect through two access openings of the main run.
Figure 8:
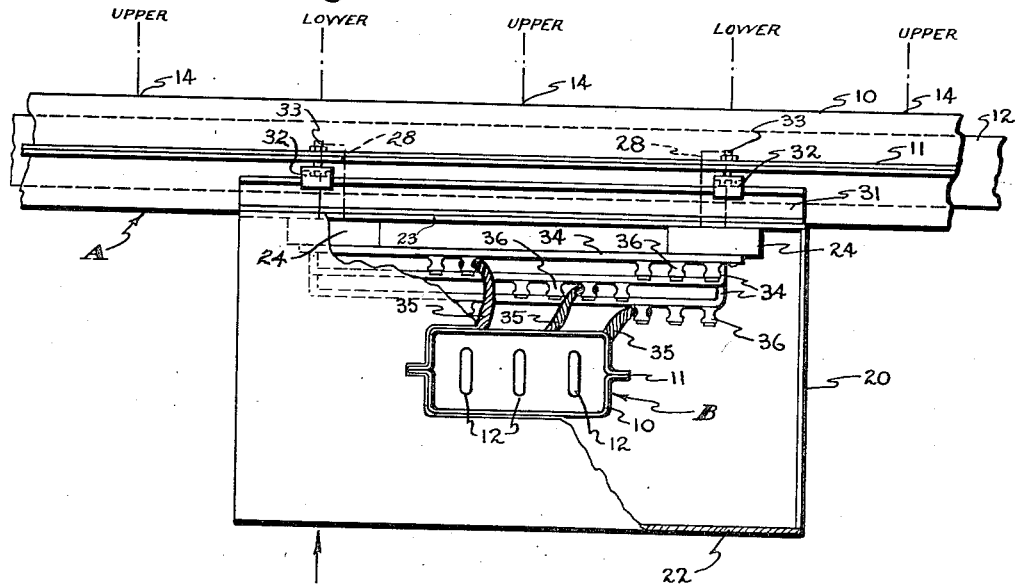
Figure 9:
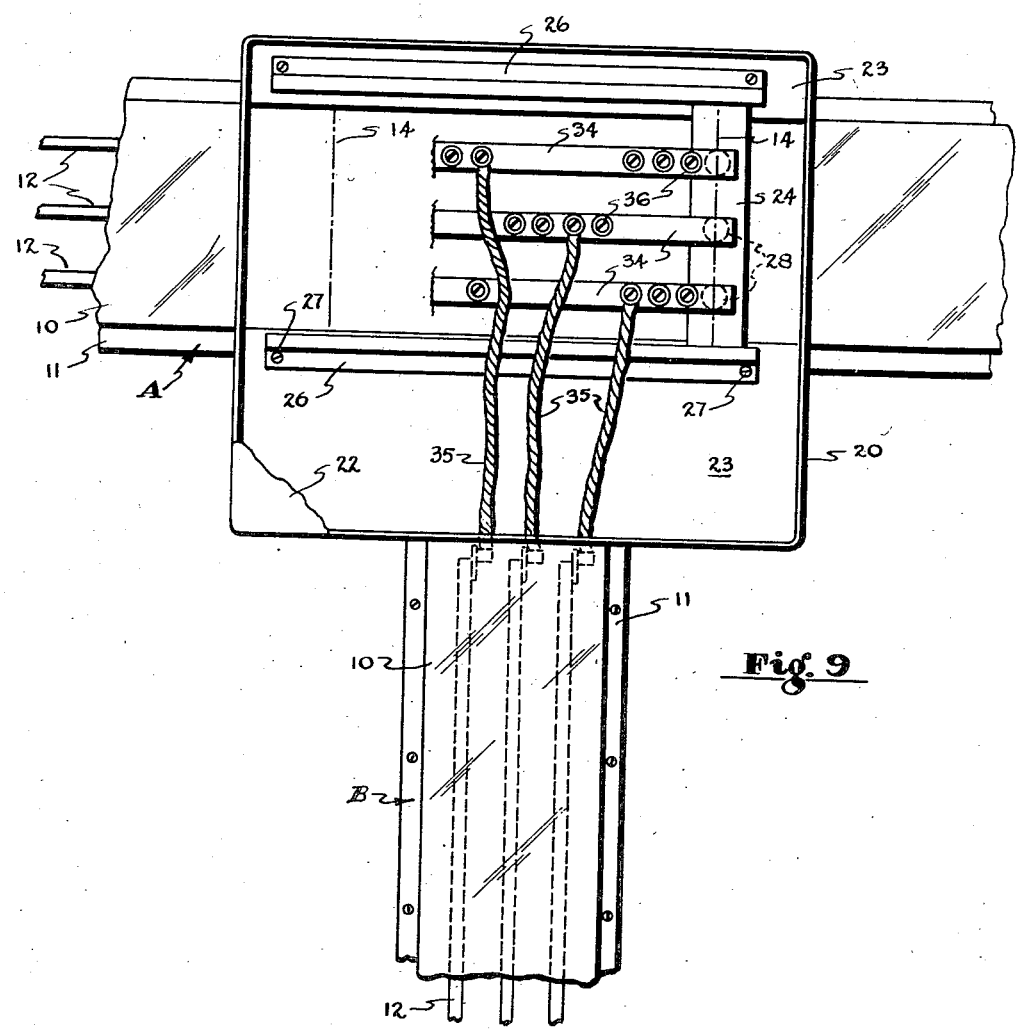

Conductor straps 34 of suitable length, are mounted on block 24, and are connected to connectors 28. Flexible terminal straps 35, are connected to selected binding posts 36 on straps 34 for connecting straps 34 to the branch conductors.

Where but one block 24 and but one set of connectors 28 are used to connect the branch conductors to the main conductors, the straps 34 are very short, being only long enough to accommodate one set of binding posts 36. (Figs. 4-6). However, where two blocks 24 and two sets of connectors 28 are used (Figs. 7-9) to connect the branch conductors to the main conductors, through two adjacent access openings 14, as where an increased capacity of the branch conductors suggests the use of two sets of connectors 28 in parallel, then straps 34 are longer, stretching over two adjacent access openings.

An important characteristic of the terminal box is the fact that the position of the box, determined by the location of the branch run is adjustable and independent of the position of connectors 28, determined by the location of the selected opening 14 of the main run A; that adjustment makes it possible to establish contact in any easy manner between a main run and a branch run not aligned with respect to a selected access opening of that main run.

By virtue of the box having an open bottom, great flexibility of location of branch runs with respect to a main run is assured. The branch run, connected to the box 20, may be located wherever desired; the open bottom of the box permits the connectors 28 which connect that branch run through the selected opening of the main run to be adjusted independently of the box and of the branch run to align with the selected access opening of the main run. The open bottom characteristic of the box is greatly responsible for the flexibility and independence of adjustment which the terminal box herein disclosed may be seen to have.

The open bottom of the box, however, does not remain open when the box is mounted on a main run, but rather, is closed by the main run being properly shaped to be closed by the main run.

The box 20, its block 24 and connectors 28, and straps 34, and possibly also straps 35, may be applied to a main run as a unit, whereafter the position of the box with respect to parts 24—28—34—35 and with respect to the main run, may be adjusted to complete the connection.

The box 20 and its parts may be used to form a T connection between a branch run and a main run, where the branch run crosses the main run, rather than ending at the main run. It will therefore be understood that the term "terminal box" applies to a device for connecting the terminal of a branch run to a main run, or for connecting an intermediate point of a branch run to a main run where the branch run crosses the main run.

The opening 29 may be larger than the branch conduit in a direction perpendicular to the main run whereby the position of the box with respect to the branch run is adjustable in that direction, though non-adjustable with respect to the branch run in the direction of the run of the main run. The excess opening left thus, in the box, may be closed by an adjustable cover, such as a slide. This permits a branch run, located anywhere with respect to the main, to be connected to it, through a box.

Now having fully described the terminal box of this application, reference should be had to the claims which follow.

I claim:

1. In a distribution system, a main run comprising a conduit having longitudinally and uniformly spaced access openings, conductors within the main run conduit, a branch run comprising a conduit and, conductors therein, and a terminal box secured to the branch run conduit and whose location is determined by that of the branch run conduit, adjustable means for securing the box to the main run conduit in the location determined for it by the position of the branch run conduit, with the box formed with an open side of a size that will encompass at least one main run access opening no matter at what point the box is disposed along the main run, the box opening being so shaped that it will be closed by the main run conduit when the box is secured to the main run, connectors within the box formed for entering the main run through an access opening to make contact with the conductors of the main run, the connectors being connected to the conductors of the branch run, and formed to be adjustable in position with respect to the branch run conductors so as to be movable to an access opening within the box opening regardless of the position of the branch run, and means for adjustably positioning and mounting the connectors within the box to align them to an access opening regardless of the relative positions of the box and that access opening.

2. In a distribution system, a main run comprising a conduit having longitudinally and uniformly spaced access openings, conductors within the main run conduit, a branch run comprising a conduit and, conductors therein, and a terminal box secured to the branch run conduit and whose location is determined by that of the branch run conduit, adjustable means for securing the box to the main run conduit in the location determined for it by the position of the branch run conduit, with the box formed with an open side of a size that will encompass at least one main run access opening no matter at what point the box is disposed along the main run, the box opening being so shaped that it will be closed by the main run conduit when the box is secured to the main run, connectors within the box formed for entering the main run through an access opening to make contact with the conductors of the main run, the connectors being connected to the conductors of the branch run, and formed to be adjustable in position with respect to the branch run conductors so as to be movable to an access opening within the box opening regardless of the position of the branch run, and means for adjustably positioning and mounting the connectors within the box to align them to an access opening regardless of the relative positions of the box and that access opening, the box and the connectors therein and the means for mounting the connectors therein together comprising a unitary adjustable device, attachable to a branch run for connecting the conduit and the conductors thereof to a main run conduit and the conductors thereof at and through a selected access opening of the main run.

3. For connecting a branch run of conduit containing conductors to a main run of conduit containing conductors, a terminal box, non-adjustable means for connecting the box to the conduit of a branch run, conductor connectors adjustably positioned in the box and adjustable with respect to and connected to the branch run conductors, and means for adjustably mounting the box on the conduit of the main run and adjustable independently of the connectors, the main run conduit having longitudinally and uniformly spaced access openings, the box having an open side of a size that will encompass at least one main run access opening no matter at what point the box is disposed along the main run.

4. For connecting a branch run of conduit containing conductors to a main run of conduit containing conductors, a terminal box, non-adjustable means for connecting the box to the conduit of a branch run, conductor connectors adjustably positioned in the box and adjustable with respect to and connected to the branch run conductors, and means for adjustably mounting the box on the conduit of the main run and adjustable independently of the connectors, the main run conduit having longitudinally and uniformly spaced access openings, the box having an open side of a size that will encompass at least one main run access opening no matter at what point the box is disposed along the main run, the box opening being so shaped that it will be closed by the main run conduit when the box is secured to the main run.

ALVA A. TOGESEN.